United States Patent
Mackin et al.

(10) Patent No.: US 10,189,572 B2
(45) Date of Patent: Jan. 29, 2019

(54) SYSTEMS AND METHODS FOR PREVENTING ICE FORMATION ON PORTIONS OF AN AIRCRAFT

(71) Applicant: THE BOEING COMPANY, Chicago, IL (US)

(72) Inventors: Steve Mackin, Bellevue, WA (US); Robert Earl Fisher, Everett, WA (US)

(73) Assignee: The Boeing Company, Chicago, IL (US)

( * ) Notice: Subject to any disclaimer, the term of this patent is extended or adjusted under 35 U.S.C. 154(b) by 368 days.

(21) Appl. No.: 15/144,018

(22) Filed: May 2, 2016

(65) Prior Publication Data

US 2017/0313428 A1 Nov. 2, 2017

(51) Int. Cl.
*B64D 15/04* (2006.01)
*F02C 7/047* (2006.01)
*F02C 6/08* (2006.01)

(52) U.S. Cl.
CPC .............. *B64D 15/04* (2013.01); *F02C 6/08* (2013.01); *F02C 7/047* (2013.01); *F05D 2240/35* (2013.01)

(58) Field of Classification Search
CPC ........ B64D 15/04; B64D 15/00; B64D 15/02; B64D 33/02; B64D 2033/0233; F02C 7/047; F02C 7/04; F05D 2240/35; F01D 25/02; Y10T 137/0536
See application file for complete search history.

(56) References Cited

U.S. PATENT DOCUMENTS

| | | | | |
|---|---|---|---|---|
| 1,924,122 A * | 8/1933 | Jones | ............... | B64D 15/04 244/134 B |
| 2,507,044 A * | 5/1950 | Palmatier | ............... | B64D 15/02 165/231 |
| 2,581,760 A * | 1/1952 | Miner | ............... | B64D 15/02 244/134 R |
| 2,625,010 A * | 1/1953 | Clark | ............... | F02C 7/047 244/134 C |
| 2,750,737 A * | 6/1956 | Leigh | ............... | F02C 7/047 200/81 R |

(Continued)

FOREIGN PATENT DOCUMENTS

| | | |
|---|---|---|
| GB | 622627 | 5/1949 |
| GB | 637598 | 5/1950 |
| WO | WO 2015/059489 | 4/2015 |

OTHER PUBLICATIONS

Extended European Search Report for EP 17158961.7-1607, dated Sep. 13, 2017.

*Primary Examiner* — Medhat Badawi
(74) *Attorney, Agent, or Firm* — Joseph M. Butscher; The Small Patent Law Group, LLC (57) ABSTRACT

An ice prevention system is configured to prevent ice from forming and/or melt ice with respect to one or more portions of an aircraft. The ice prevention system includes a combustor having an air inlet and a gas outlet. A supply air conduit is coupled to the air inlet of the combustor. The supply air conduit is configured to channel low pressure air to the combustor. One or more delivery conduits are coupled to the gas outlet of the combustor. The delivery conduit(s) are configured to be coupled to the one or more portions of the aircraft. The combustor is configured to exhaust heated gas to the delivery conduit(s) through the gas outlet to prevent ice from forming with respect to the portion(s) of the aircraft.

27 Claims, 6 Drawing Sheets

(56) References Cited

U.S. PATENT DOCUMENTS

| | | | | |
|---|---|---|---|---|
| 3,441,236 A * | 4/1969 | Arnholdt | B64C 21/025 | 244/204 |
| 3,672,610 A * | 6/1972 | Levin | B06B 1/023 | 244/134 R |
| 3,684,953 A * | 8/1972 | Grant | G01N 27/223 | 324/608 |
| 3,809,341 A * | 5/1974 | Levin | B64D 15/163 | 244/134 R |
| 3,873,927 A * | 3/1975 | Overall | G01W 1/00 | 307/116 |
| 3,925,979 A * | 12/1975 | Ziegler | F02C 7/047 | 244/134 R |
| 3,981,466 A * | 9/1976 | Shah | B64D 15/02 | 165/42 |
| 4,458,865 A * | 7/1984 | Sandorff | B64D 15/163 | 244/134 R |
| 4,678,144 A * | 7/1987 | Goehner | B64D 15/16 | 244/134 D |
| 4,688,745 A * | 8/1987 | Rosenthal | B64D 15/04 | 244/134 R |
| 4,690,353 A * | 9/1987 | Haslim | B64D 15/163 | 244/134 D |
| 4,738,416 A * | 4/1988 | Birbragher | B64D 15/04 | 244/134 B |
| 4,782,658 A * | 11/1988 | Perry | F02C 7/047 | 60/226.1 |
| 4,875,644 A * | 10/1989 | Adams | B64D 15/163 | 244/134 D |
| 4,895,322 A * | 1/1990 | Zieve | B64D 15/163 | 244/134 D |
| 5,022,612 A * | 6/1991 | Berson | B64D 15/163 | 244/134 A |
| 5,067,903 A * | 11/1991 | Szyszkowski | A61N 1/3752 | 439/493 |
| 5,074,497 A * | 12/1991 | Phillips, II | B64D 15/163 | 244/134 A |
| 5,088,277 A * | 2/1992 | Schulze | B64D 15/04 | 244/134 R |
| 5,129,598 A * | 7/1992 | Adams | B64D 15/163 | 244/134 A |
| 5,143,325 A * | 9/1992 | Zieve | B64D 15/163 | 244/134 D |
| 5,152,480 A * | 10/1992 | Adams | B64D 15/12 | 244/134 D |
| 5,248,116 A * | 9/1993 | Rauckhorst | B64D 15/166 | 244/134 A |
| 5,257,498 A * | 11/1993 | Nikkanen | B64D 15/04 | 244/134 B |
| 5,272,400 A * | 12/1993 | Goldberg | B64D 15/20 | 244/134 R |
| 5,326,051 A * | 7/1994 | Pisarski | B64D 15/163 | 216/13 |
| 5,346,160 A * | 9/1994 | Pisarski | B64D 15/163 | 244/134 R |
| 5,361,183 A * | 11/1994 | Wiese | B64D 15/12 | 361/42 |
| 5,400,984 A * | 3/1995 | Arnold | B64D 15/04 | 244/134 B |
| 5,429,327 A * | 7/1995 | Adams | B64D 15/163 | 244/134 D |
| 5,544,845 A * | 8/1996 | Giamati | B64D 15/12 | 244/134 A |
| 5,547,150 A * | 8/1996 | Adams | B64D 15/16 | 244/134 R |
| 5,553,814 A * | 9/1996 | Rauckhorst, III | B64D 15/166 | 244/134 A |
| 5,553,815 A * | 9/1996 | Adams | B64D 15/163 | 244/134 R |
| 5,609,314 A * | 3/1997 | Rauckhorst, III | B64D 15/16 | 244/134 A |
| 5,657,952 A * | 8/1997 | Goldberg | B64D 15/163 | 244/134 D |
| 5,807,454 A * | 9/1998 | Kawabe | B29C 70/443 | 156/214 |
| 5,904,322 A * | 5/1999 | Giamati | B64D 15/166 | 244/134 B |
| 5,971,323 A * | 10/1999 | Rauch | B64D 15/12 | 219/202 |
| 6,003,814 A * | 12/1999 | Pike | B64D 15/04 | 239/587.1 |
| 6,079,670 A * | 6/2000 | Porte | B64D 15/04 | 165/170 |
| 6,102,333 A * | 8/2000 | Gerardi | B64D 15/163 | 244/134 A |
| 6,145,787 A * | 11/2000 | Rolls | B64D 15/12 | 219/545 |
| 6,338,455 B1 * | 1/2002 | Rauch | B64D 15/12 | 244/134 D |
| 6,427,434 B2 * | 8/2002 | Porte | B64D 15/04 | 244/134 B |
| 6,585,191 B2 * | 7/2003 | Andre | B64D 15/04 | 244/134 B |
| 6,702,233 B1 * | 3/2004 | DuPont | B64D 15/04 | 244/134 B |
| 8,100,364 B2 * | 1/2012 | Nieman | B64D 15/04 | 244/134 B |
| 8,209,950 B2 * | 7/2012 | Jain | B64D 15/16 | 239/265.39 |
| 8,342,443 B2 * | 1/2013 | Gatzke | B64D 13/08 | 244/134 B |
| 8,344,323 B1 * | 1/2013 | Hartley | A61B 5/6816 | 250/338.1 |
| 8,579,236 B2 * | 11/2013 | Wollaston | B64D 15/04 | 244/134 B |
| 8,602,359 B2 * | 12/2013 | Stothers | B64D 15/12 | 244/134 D |
| 8,757,547 B2 * | 6/2014 | Porte | B64D 33/02 | 244/134 B |
| 9,108,737 B2 * | 8/2015 | Zysman | B64D 33/00 | |
| 9,309,781 B2 * | 4/2016 | Roby | F01D 25/02 | |
| 9,759,088 B2 * | 9/2017 | Belmonte | F01D 25/02 | |
| 9,945,247 B2 * | 4/2018 | Appukuttan | F01D 25/10 | |
| 10,001,062 B2 * | 6/2018 | Warnet | F02C 7/18 | |
| 2002/0139899 A1 * | 10/2002 | Porte | B64D 15/04 | 244/134 B |
| 2002/0139900 A1 * | 10/2002 | Porte | B64D 15/04 | 244/134 C |
| 2003/0150955 A1 * | 8/2003 | Daggett | B64O 21/00 | 244/57 |
| 2004/0094359 A1 * | 5/2004 | Porte | B64D 33/02 | 181/214 |
| 2004/0206854 A1 * | 10/2004 | Shah | B64D 15/20 | 244/144 |
| 2005/0006529 A1 * | 1/2005 | Moe | B64D 15/12 | 244/134 D |
| 2005/0269443 A1 * | 12/2005 | Porte | F01D 21/04 | 244/53 B |
| 2007/0102582 A1 * | 5/2007 | Botura | B64D 15/14 | 244/134 D |
| 2007/0125908 A1 * | 6/2007 | Eichholz | B64O 1/18 | 244/118.1 |
| 2009/0152401 A1 * | 6/2009 | Sternberger | B64D 33/02 | 244/134 B |
| 2009/0194633 A1 * | 8/2009 | De Souza | B64D 15/04 | 244/54 |
| 2009/0230239 A1 * | 9/2009 | Stothers | B64D 15/14 | 244/58 |
| 2009/0314899 A1 * | 12/2009 | Porte | B64D 15/04 | 244/53 B |
| 2010/0199629 A1 * | 8/2010 | Chene | B64D 15/12 | 60/39.093 |
| 2010/0243811 A1 * | 9/2010 | Stothers | B64D 15/14 | 244/134 R |
| 2010/0252685 A1 * | 10/2010 | Porte | B64D 15/04 | 244/134 B |
| 2010/0294882 A1 * | 11/2010 | Gantie | B64D 15/163 | 244/1 N |

(56) References Cited

U.S. PATENT DOCUMENTS

| | | | | |
|---|---|---|---|---|
| 2011/0011981 A1* | 1/2011 | Vauchel | ............... | B64D 33/02 244/134 B |
| 2011/0031353 A1* | 2/2011 | Stolte | ............... | B64C 21/04 244/207 |
| 2011/0036950 A1* | 2/2011 | Guillermond | ............... | B64D 15/12 244/134 R |
| 2011/0139927 A1* | 6/2011 | Porte | ............... | B64D 15/04 244/1 N |
| 2011/0139940 A1* | 6/2011 | Porte | ............... | B64D 33/02 244/53 B |
| 2011/0168839 A1* | 7/2011 | Porte | ............... | B64D 29/06 244/1 N |
| 2011/0168852 A1* | 7/2011 | Porte | ............... | B64C 21/10 244/53 B |
| 2012/0048389 A1* | 3/2012 | Chelin | ............... | B64D 15/04 137/15.1 |
| 2012/0090695 A1* | 4/2012 | Porte | ............... | B64D 33/02 137/15.1 |
| 2012/0248249 A1* | 10/2012 | Hormiere | ............... | B64D 15/04 244/134 B |
| 2012/0298802 A1* | 11/2012 | Todorovic | ............... | B64D 15/04 244/134 B |
| 2012/0318922 A1* | 12/2012 | Saito | ............... | B64C 3/28 244/134 B |
| 2012/0318924 A1* | 12/2012 | Porte | ............... | B64D 33/02 244/134 D |
| 2013/0228653 A1* | 9/2013 | Breer | ............... | B64D 15/12 244/134 D |
| 2014/0070054 A1* | 3/2014 | Burton | ............... | B64D 15/12 244/134 D |
| 2014/0191082 A1* | 7/2014 | Figueroa-Karlstrom | ............... | B64D 15/163 244/134 A |
| 2015/0104289 A1* | 4/2015 | Mackin | ............... | F04D 27/023 415/1 |
| 2016/0257413 A1* | 9/2016 | Newman | ............... | F02C 7/047 |
| 2017/0210477 A1* | 7/2017 | Mackin | ............... | B64D 15/08 |
| 2017/0313428 A1* | 11/2017 | Mackin | ............... | B64D 15/04 |

* cited by examiner

SYSTEMS AND METHODS FOR PREVENTING ICE FORMATION ON PORTIONS OF AN AIRCRAFT

FIELD OF THE DISCLOSURE

Embodiments of the present disclosure generally relate to systems and methods for preventing ice formation on portions of an aircraft, such as engines and wings of the aircraft.

BACKGROUND OF THE DISCLOSURE

Various aircraft prevent ice from forming on or in wings and engine surfaces by diverting bleed air from the engines to the wings and the engine surfaces. Bleed air is extracted from a core of the engine and diverted to the wings and engine surfaces. In particular, air from the engine core is heated by compression. The engine core compresses the air until the air reaches a suitable temperature to be used to prevent ice formation. As such, the engine core uses energy to compress and therefore heat the air. Because a portion of the energy expended by engine core is for purposes of preventing ice formation (such as through diverting bleed air at elevated temperatures to portion of the aircraft), the efficiency of the engine core is reduced. That is, a portion of the energy generated by the engine core is used for ice prevention, instead of propulsion.

Further, as aircraft continue to be developed, wing length is increasing, while engine size is decreasing. However, smaller engines may not be well-suited to generate sufficient airflow to efficiently prevent ice formation on the longer wings, for example.

SUMMARY OF THE DISCLOSURE

A need exists for an efficient system and method for preventing ice formation on and in portions of an aircraft. A need exists for a system and method that increases engine efficiency of an aircraft.

With those needs in mind, certain embodiments of the present disclosure provide an ice prevention system that is configured to prevent ice from forming with respect to one or more portions of an aircraft. The ice prevention system includes a combustor having an air inlet and a gas outlet. A supply air conduit is coupled to the air inlet of the combustor. The supply air conduit is configured to channel low pressure air to the combustor. One or more delivery conduits are coupled to the gas outlet of the combustor. The delivery conduit(s) are also configured to be coupled to the portion(s) of the aircraft. The combustor is configured to exhaust heated gas to the delivery conduit(s) through the gas outlet to prevent ice from forming and/or melt ice with respect to the portion(s) of the aircraft.

The ice prevention system may also include an engine including a housing that contains a fan and an engine core. The combustor may be secured within the housing of the engine. The supply air conduit may be configured to receive the low pressure air from one or more engine compressors.

The ice prevention system may include a combustor fuel supply conduit coupling the combustor to a main fuel supply conduit of an engine. A first valve may be disposed within the supply air conduit. The first valve is configured to be selectively actuated between open and closed positions. A second valve may be disposed within the combustor fuel supply conduit. The second valve is configured to be selectively actuated between open and closed positions.

The ice prevention system may include an ice prevention control unit in communication with an igniter of the combustor. The ice prevention control unit may be in communication with and configured to control the igniter, the first valve, and the second valve. In at least one embodiment, the ice prevention control unit is configured to open the first valve to channel the low pressure air into the combustor through the supply air conduit, open the second valve to provide fuel to the combustor, activate the igniter to ignite a flame within the combustor, monitor a temperature of the flame to determine whether a desired flame temperature has been reached, and monitor a temperature of the exhausted heated gas to determine whether a desired gas temperature has been reached.

The delivery conduit(s) may include one or both of an engine lip delivery conduit configured to channel the exhausted heated gas to an interior chamber of a lip skin of an engine, and/or a wing delivery conduit configured to channel the exhausted heated gas to an internal chamber of a leading edge of a wing of the aircraft. In at least one embodiment, at least one condensate collection barrier is coupled to at least one transfer conduit within one or both of the interior chamber of the lip skin or the internal chamber of the leading edge of the wing. The condensate collection barrier(s) is configured to guide condensate into the transfer conduit(s) and out of one or more exhaust outlets formed through one or both of the lip skin of the engine or the leading edge of the wing.

The ice prevention system may include a bypass conduit that is configured to couple a bleed air outlet of an engine core to the delivery conduit(s), and a valve disposed within the bypass conduit. The valve is configured to be selectively actuated between an open position in which high pressure heated gas from the engine core is supplied to the delivery conduit(s), and a closed position that prevents the high pressure heated gas from passing into the delivery conduit(s).

The ice prevention system may include at least one swirl nozzle disposed within the delivery conduit(s). The swirl nozzle(s) is configured to be selectively actuated between a first position and a second position. The first position may be a low pressure setting, and the second position may be a high pressure setting.

Certain embodiments of the present disclosure provide an ice prevention method of preventing ice from forming with respect to one or more portions of an aircraft. The ice prevention method includes coupling a supply air conduit to an air inlet of the combustor, coupling one or more delivery conduits to a gas outlet of the combustor and the portion(s) of the aircraft, channeling low pressure air to the combustor through the supply air conduit, exhausting heated gas from the combustor to the delivery conduit(s) through the gas outlet, delivering the heated gas to the portion(s) of the aircraft through the delivery conduit(s), and preventing ice from forming and/or melting ice with respect to the portion(s) of the aircraft due to the delivering operation.

Certain embodiments of the present disclosure provide an aircraft that includes a fuselage, wings extending from the fuselage, an empennage extending from the fuselage, at least one engine connected to one or more of the fuselage, the wings, or the empennage, and an ice prevention system that is configured to prevent ice from forming with respect to one or more portions of an aircraft.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Embodiments of the present disclosure provide systems and methods of generating heated air through products of combustion from low stage engine bleed air in order to prevent ice from forming on or in portions of an aircraft, such as engine and wing surfaces. The system and method may extract air from lower stages of an engine (such as a fan) and heat the air using jet fuel and a combustor. The system and method are configured to distribute hot low pressure air to portions of an aircraft in order to prevent ice from forming on or within the portion of the aircraft.

Certain embodiments of the present disclosure provide an anti-icing (or de-icing) system that includes a combustor (such as a combustion can) that may be coupled to an engine, a controller configured to control ignition, open and close a plurality of valves to enable combustion and exhaust hot air, and a plurality of devices configured to control the exhaust hot air to a plurality of leading edges wherein the devices are configured for capturing condensation. At least one of the valves may be connected to a low stage supply of a fan engine. The plurality of devices may include a swirl nozzle and an exit port. The exit port may include a condensate collection barrier, such as a scupper, coupled to a transfer conduit, such as a plastic tube (such as a Tygon tube).

Certain embodiments of the present disclosure provide a method that includes generating hot gas using a combustor. The hot gas is generated by controlling ignition in the combustor that is arranged to receive low air supply from a fan of an engine. The method further includes controlling the hot gas from the combustor using a plurality of valves, sensing hot gas, and regulating a flow of the hot gas to desired temperature, such as at least 450° F. The hot gas is then guided to leading edges of a wing and/or engine. Due to combustion, condensate (such as water droplets) may also be within the hot gas. The hot gas and condensate may be guided within the leaded edges using a plurality of devices, such as a swirl nozzle that directs the hot gas around the interior surface of the leading edge. The condensate may be captured using tubes and exhaust slots on the underside of the wing to prevent ice formation on the underside of the wing. In at least one other embodiment, a condensate collection barrier, such as a scupper, may be arranged to capture condensate.

Figure 1:
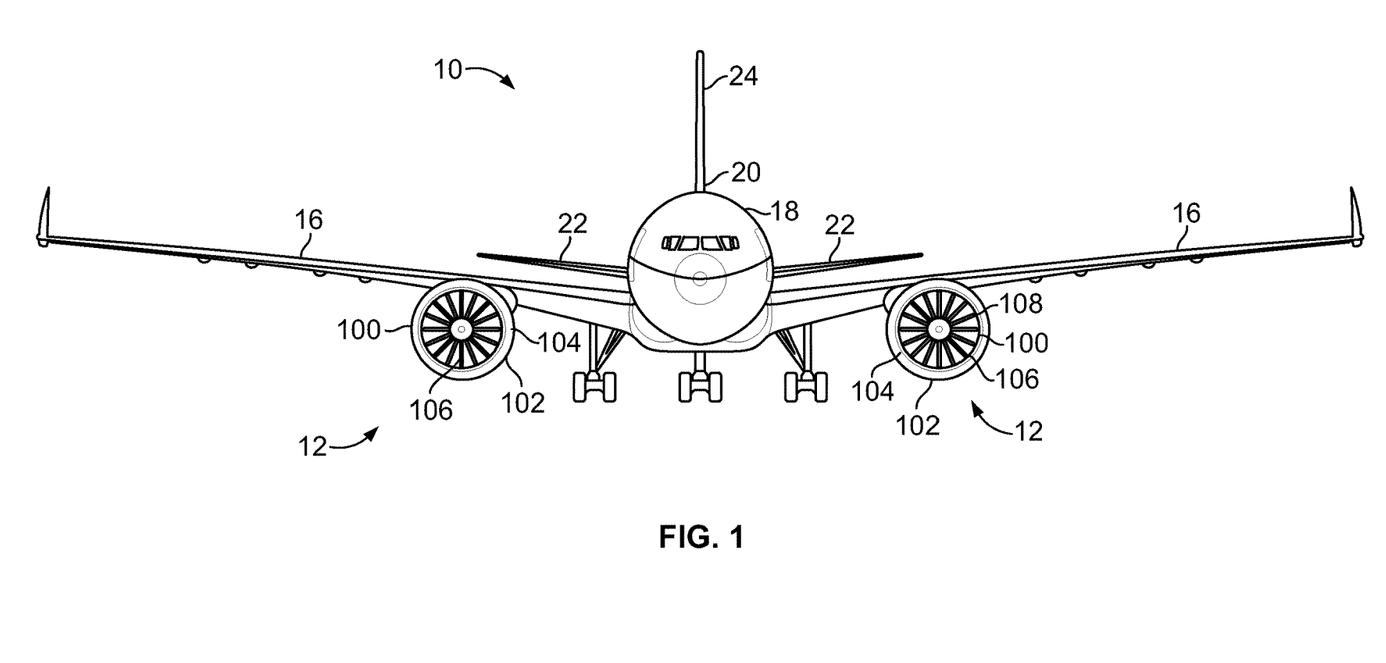
FIG. 1 is a diagrammatic representation of a front view of an aircraft, according to an embodiment of the present disclosure.

FIG. 1 is a diagrammatic representation of a front view of an aircraft 10, according to an embodiment of the present disclosure. The aircraft 10 includes a propulsion system 12 that may include two turbofan engines 100, for example. Optionally, the propulsion system 12 may include more engines 100 than shown. The engines 100 may be carried by wings 16 of the aircraft 10. In other embodiments, the engines 100 may be carried by a fuselage 18 and/or an empennage 20. The empennage 20 may also support horizontal stabilizers 22 and a vertical stabilizer 24.

Each engine 100 includes a housing 102, which includes an inlet assembly 104. The housing 102 retains a fan 106 proximate to a leading end 108 and an engine core (not shown in FIG. 1) set back from the fan 106. As described below, an ice prevention (or anti-ice) system is disposed, at least in part, within at least one of the engines 100. The ice prevention system is configured to prevent ice formation on and in portions of the aircraft, such as the housing 102 and leading edges of the wings 16.

Figure 2:
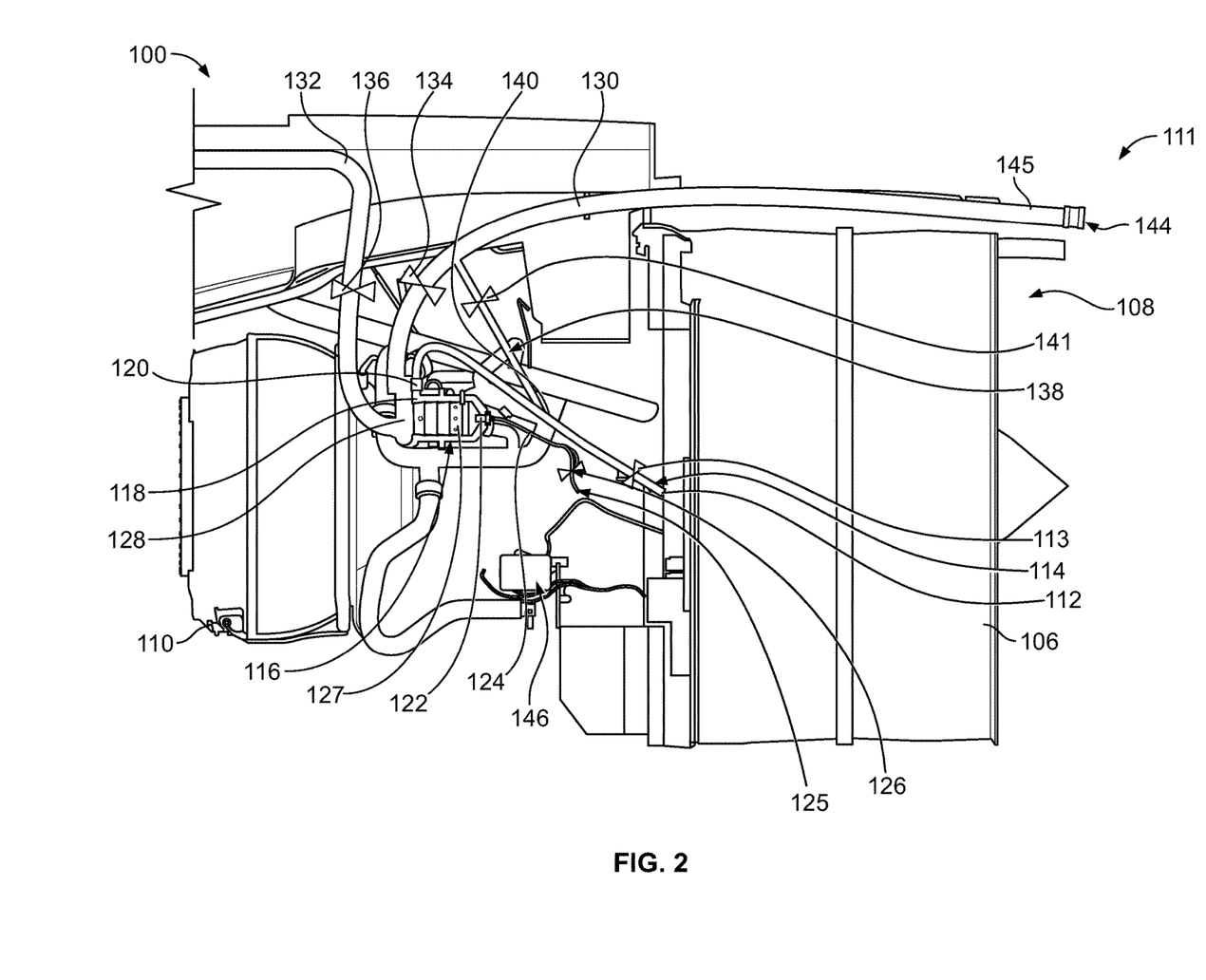
FIG. 2 is a diagrammatic representation of an internal longitudinal view of an engine, according to an embodiment of the present disclosure.

FIG. 2 is a diagrammatic representation of an internal longitudinal view of an engine 100, according to an embodiment of the present disclosure. The housing 102 of the engine 100 is not shown in FIG. 2. As noted, the fan 106 is positioned proximate to the leading end 108, while an engine core 110 is set back from the fan 106.

An ice prevention system 111 is positioned within the engine 100. The ice prevention system 111 includes an air supply conduit 112 (such as a tube, hose, or the like) that is positioned behind the fan 106, and is configured to receive air that passes through the fan 106. For example, the air supply conduit 112 includes an air inlet 114 through which air that passes through the fan 106 and/or at least portion of one or more engine compressors enters the air supply conduit 112.

A valve 113 is disposed within the air supply conduit 112. The valve 113 is configured to be actuated between open and closed positions, or pressure regulated. In the open position, air passing out of the fan 106 passes through the air supply conduit 112. In the closed position, air passing out of the fan 106 is prevented from passing through the air supply conduit 112.

The air supply conduit 112 is coupled to a combustor (such as a combustion can) 116 that may be secured within the housing 102 of the engine 100. For example, the combustor 116 may be secured to an outer portion of the engine core 110. The combustor 116 may not be a combustor of the engine core 110. The combustor 116 includes an air inlet 118 coupled to an air outlet 120 of the air supply conduit 112. The combustor 116 also includes a fuel nozzle 122 coupled to a combustor fuel supply conduit 124 that connects to a main fuel supply conduit 125. A fuel valve 126 is disposed within the combustor fuel supply conduit 124, and is configured to be controlled to regulate an amount of fuel delivered to the combustor 116 from a fuel supply (such as jet fuel within a fuel tank). The combustor 116 also includes an ignitor 127, which is configured to ignite fuel as the fuel is supplied to the combustor 116. The combustor 116 also includes a gas outlet 128.

The gas outlet 128 of the combustor 116 is coupled to an engine lip delivery conduit 130 and a wing delivery conduit 132. Alternatively, the gas outlet 128 may be coupled to one of the engine lip delivery conduit 130 or the wing delivery conduit 132. The combustor 116 is configured to deliver heated gas to the engine lip delivery conduit 130 and the wing delivery conduit 132 via the gas outlet 128. The heated gas generated by the combustor 116 is used to prevent ice formation (or melt ice) on and in portions of the engine 100 and wings 16 of the aircraft 10 (shown in FIG. 1). Optionally, the gas outlet 128 may be coupled to additional delivery conduits that are coupled to various other portions of the engine or aircraft to prevent ice formation or crystal accumulation on and/or in such portions.

A valve 134 is disposed within the engine lip delivery conduit 130. Additionally, a valve 136 is disposed within the wing delivery conduit 132. The valves 134 and 136 are configured to be selectively actuated between open and closed positions or pressure regulated to control the flow of heated gas through the engine lip delivery conduit 130 and the wing delivery conduit 132.

A bypass conduit 138 may connect a bleed air outlet 140 of the engine core 110 to the engine lip delivery conduit 130. A valve 141 is disposed within the bypass conduit 138 and is configured to be selectively actuated between open and closed positions. Alternatively, the engine 100 may not include the bypass conduit 138.

A swirl nozzle 144 is disposed proximate a distal end 145 of the engine lip delivery conduit 130. The swirl nozzle 144 may be selectively moveable between two positions or pressure regulated. For example, the swirl nozzle 144 may include one or more first openings and one or more second openings. The swirl nozzle 144 may be moved into a first position in which the first openings are configured to allow gas to be delivered out of the swirl nozzle 144. The swirl nozzle 144 may be moved into a second position (such as through rotation) in which the second openings are configured to allow gas to be delivered out of the swirl nozzle 144. The swirl nozzle 144 may be selectively switched between a low pressure setting (for example, the first position) and a high pressure setting (for example, the second position). The swirl nozzle 144 is set in the low pressure setting when the combustor 116 supplies low pressure heated gas (for example, gas that is not heated via compression) to the engine lip delivery conduit 130. The swirl nozzle 144 is set in the high pressure setting when the valve 141 is opened to deliver high pressure heated gas (for example, gas that is heated by compression within the engine core 110) to the engine lip delivery conduit 130.

An ice prevention control unit 146 may be secured within the engine 100 and is in communication with the combustor 116, such as through one or more wired or wireless connections. Accordingly, the ice prevention control unit 146 may be configured to control operation of the combustor 116. Optionally, the ice prevention control unit 146 may be remotely located from the engine 100, such as within a pylon or aircraft electronic bay.

In at least one embodiment, the ice prevention control unit 146 is in communication with the valves 113, 134, 136, and 141, such as through one or more wired connections. As such, the ice prevention control unit 146 is configured to control operation of the valves 113, 134, 136, and 141. Optionally, the ice prevention control unit 146 is not in communication with one or all of the valves 113, 134, 136, and 141.

The ice prevention control unit 146 may also be in communication with the swirl nozzle 144, such as through one or more wired or wireless connections. In this manner, the ice control unit 146 may be configured to control operation of the swirl nozzle 144. Optionally, the ice prevention control unit 146 is not in communication with the swirl nozzle 144.

The ice prevention control unit 146 may control the ice prevention system 111 in a low pressure mode. In the low pressure mode, the valve 113 within the air supply conduit 112 is opened while the valve 141 within the bypass conduit 138 is closed in order to deliver low pressure air (for example, air that has not been compressed within the engine core 110) to the combustor 116 via the air supply conduit 112. The ice prevention control unit 146 may operate the valves 113 and 141.

Prior to low pressure air being delivered to the combustor 116, the valve 134 or valve 136 is opened, and then the ice prevention control unit 146 activates the ignitor 127. Upon activation of the ignitor 127, the ice prevention control unit 146 opens the valve 126 within the combustor fuel supply conduit 124 to provide fuel to the combustor 116 from the main fuel supply conduit 125. The ignitor 127 ignites the fuel within the combustor 116 to generate a flame within the combustor 116. The ice prevention control unit 146 may monitor the temperature of the burning fuel within the combustor 116, such as through one or more combustion sensors (for example, an optical sensor) and/or temperature sensors (for example, a thermometer, thermostat, or the like). The ice prevention control unit 146 controls the fuel supplied to the combustor 116, by way of the valve 126 and the ignitor 127 to generate exhaust hot gas at a desired temperature. For example, the ice prevention control unit 146 may control the temperature of the exhausted hot gas to be 400° F. Alternatively, the exhausted hot gas may be greater than 400° F. It has been found that a combination of airflow and an exhaust hot gas having a temperature of 400° F. efficiently prevents ice from forming on or within an engine housing and wing surfaces.

The ice prevention control unit 146 may sense a temperature of an ignited flame and/or discharge temperature of heated gas through one or more temperature sensors. If the desired temperature(s) has been reached, the ice prevention control unit 146 may deactivate the igniter (in response to detection of combustion) and regulate fuel flow to the combustor 116 (by way of the valve 113, for example) to maintain a desired temperature of exhausted heated gas.

The exhausted hot gas from the combustor 116 is delivered to a leading lip of the engine 100 through the engine lip delivery conduit 130 when the valve 134 is open. Further, the exhausted hot gas from the combustor 116 is delivered to one or more leading edges of one or more wings via the wing delivery conduit 132 when the valve 136 is open. In at least one embodiment, the ice prevention control unit 146 may close the valve 136 so that all of the exhausted hot gas is delivered to the leading lip of the engine 100. Conversely, the ice prevention control unit 146 may close the valve 134 so that all of the exhausted hot gas is delivered to the leading edge(s) of the wing(s).

When the combustor 116 is operating to generate heated gas to one or both of the engine lip delivery conduit 130 and/or the wing delivery conduit 132, the ice prevention control unit 146 maintains the valve 113 in the open position. The ice prevention control unit 146 may also control the swirl nozzle 144 in a low pressure setting that effectively and safely delivers the exhausted heated gas (which is at a low pressure) to the engine lip delivery conduit 130 coupled to a lip skin of the engine 100.

Optionally, the ice prevention system 111 may be operated in a high pressure mode, in which gas from the engine core 110 is heated therein by compression and delivered to the engine lip delivery conduit 130 and the wing delivery conduit 132. In at least one embodiment, the ice prevention control unit 146 is configured to operate the ice prevention system 111 in the high pressure mode.

In the high pressure mode, the valve 113 is closed, thereby preventing low pressure air from passing into the combustor 116. The valve 141 is opened so that high pressure heated gas (heated by compression within the engine core 110) passes from the bypass conduit 138 into the engine lip delivery conduit 130 and the wing delivery conduit 132. In the high pressure mode, the swirl nozzle 144 is switched to the high pressure setting. For example, in the high pressure setting, the swirl nozzle 144 may be actuated to a position in which larger air outlets (in comparison to smaller air outlets used for the low pressure setting) are used to deliver air to the engine lip delivery conduit 130. The larger air outlets may be used to control the rate of flow into the engine lip delivery conduit 130 and/or ensure that the pressure of the heated gas in the high pressure mode does not damage the engine lip delivery conduit 130.

As noted, the ice prevention control unit 146 may be configured to control the valves 134, 136, and 141, as well as the swirl nozzle 144. Optionally, the ice prevention control unit 146 may not be configured to control the valves 134, 136, and 141, and the swirl nozzle 144. Instead, the valves 134, 136, and 141, and the swirl nozzle 144 may be manually controlled.

The ice prevention control unit 146 operates the ice prevention system 111 in the low pressure mode to provide heated gas to portions of an aircraft without relying on the engine core 110 for compressed heated gas for ice prevention. As such, the engine 100 is efficiently operated in that the energy expended by the engine core 110 is used for propulsion, instead of ice prevention. In the low pressure mode, the separate and distinct combustor 116 is used to generate heated gas that is used to prevent ice formation. The ice prevention control unit 146 may switch to the high pressure mode if the combustor 116 is not operating properly, for example. In at least one embodiment, ice that may be present is melted.

As used herein, the term "control unit," "unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the ice prevention control unit 146 may be or include one or more processors that are configured to control operation of the ice prevention system 111.

The ice prevention control unit 146 is configured to execute a set of instructions that are stored in one or more storage elements (such as one or more memories), in order to process data. For example, the ice prevention control unit 146 may include or be coupled to one or more memories. The storage elements may also store data or other information as desired or needed. The storage elements may be in the form of an information source or a physical memory element within a processing machine.

The set of instructions may include various commands that instruct the ice prevention control unit 146 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the ice prevention control unit 146. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the ice prevention control unit 146 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 3:
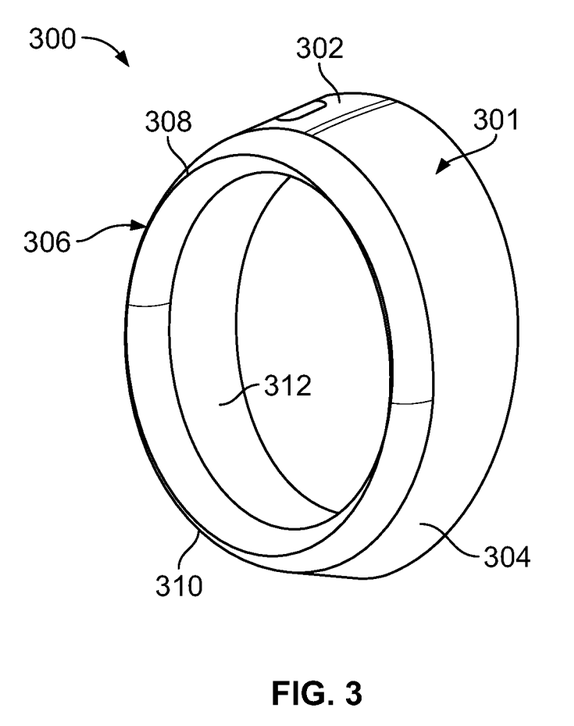
FIG. 3 is a diagrammatic representation of a perspective front view of an engine inlet assembly, according to an embodiment of the present disclosure.

FIG. 3 is a diagrammatic representation of a perspective front view of an engine inlet assembly 300, according to an embodiment of the present disclosure. The engine inlet assembly 300 is part of the housing 102 of the engine 100 (shown in FIG. 1). For example, the engine inlet assembly 300 is at the leading end 108 of the engine 100 and surrounds the fan 106.

The engine inlet assembly 300 includes an annular outer cowl 301, which may include first and second outer cowl panels 302 and 304. An annular lip skin 306 extends outwardly from a front end of the outer cowl 301. The lip skin 306 may include first and second lip skin members 308 and 310. An interior acoustic panel 312 may be secured to interior surfaces of the outer cowl 301.

Referring to FIGS. 2 and 3, the engine lip delivery conduit 130 is coupled to an interior chamber defined within the lip skin 306. The engine lip delivery conduit 130 provides heated gas to the interior chamber to prevent ice from forming within and on the lip skin 306.

Figure 4:
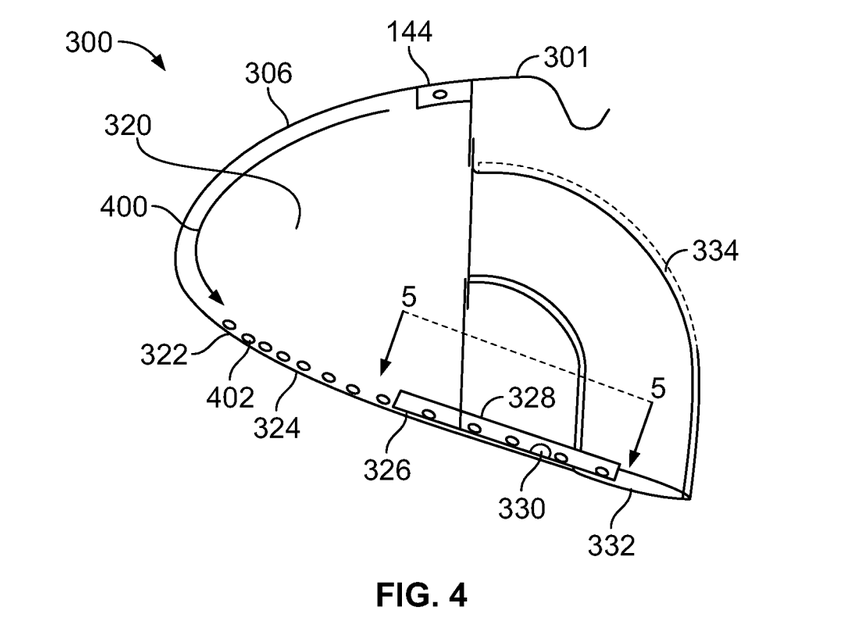
FIG. 4 is a diagrammatic representation of a cross-sectional view of a portion of an engine inlet assembly, according to an embodiment of the present disclosure.
Figure 5:
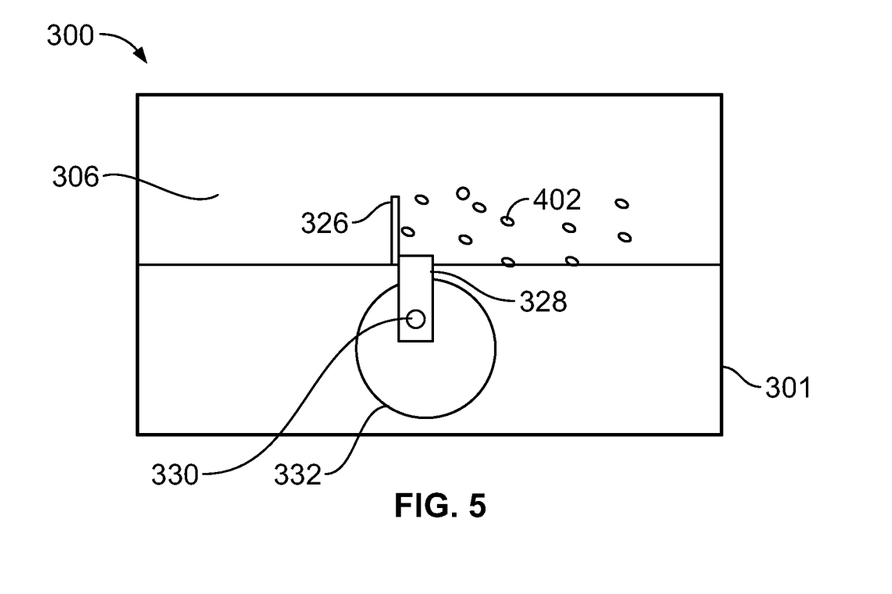
FIG. 5 is a diagrammatic representation of a cross-sectional view of a portion of an engine inlet assembly through line 5-5 of FIG. 4, according to an embodiment of the present disclosure.

FIG. 4 is a diagrammatic representation of a cross-sectional view of a portion of the engine inlet assembly 300, according to an embodiment of the present disclosure. FIG. 5 is a diagrammatic representation of a cross-sectional view of the portion of the engine inlet assembly 300 through line 5-5 of FIG. 4, according to an embodiment of the present disclosure.

Referring to FIGS. 2-5, heated gas 400 from the ice prevention system 111 is delivered to the interior chamber 320 through the swirl nozzle 144. The heated gas 400 swirls around the interior chamber 320 to prevent ice formation on and in in the lip skin 306. As a production of combustion, the heated gas 400 also contains condensate 402 (such as condensed water droplets). The condensate 402 is forced against an interior surface 322 of the lip skin 306 due to the swirling heated gas 400. The condensate 402 drops to a bottom portion 324 of the lip skin 306 due to gravity and centripetal force.

A condensate collection barrier 326, such as a scupper (for example, a wall, fin, fence, or the like) is coupled to a transfer conduit 328, such as a plastic tube (such as a Tygon tube). As the condensate 402 impinges on the condensate collection barrier 326, the condensate 402 adheres thereto, and is guided to the transfer conduit 328. An outlet 330 is formed through the transfer conduit 328. The condensate collection barrier 326 disrupts the flow of condensate 402 within the interior chamber 320 and channels the condensate 402 into the transfer conduit 328. The outlet 330 connects to an exhaust outlet, such as an exhaust hole 332 formed in the cowl 301. The exhaust hole 332 also connects to a gas outlet conduit 334 formed through the cowl 301. The gas outlet conduit 334 is in communication with the interior chamber 320. As such, the heated gas 400 within the interior chamber 320 passes out of the engine inlet assembly 300 through the exhaust hole 332 via the gas outlet conduit 334. The gas flow within the gas outlet conduit 334 assists in drawing out the condensate 402 through the exhaust hole 332. Accordingly, the condensate 402 is guided out of the engine inlet assembly 300.

It has been found that the condensate collection barrier 326 and the transfer conduit 328 increase the efficiency of condensate removal from the engine inlet assembly 300. Alternatively, the engine inlet assembly 300 may not include one or both of the condensate collection barrier 326 or the transfer conduit 328.

Figure 6:
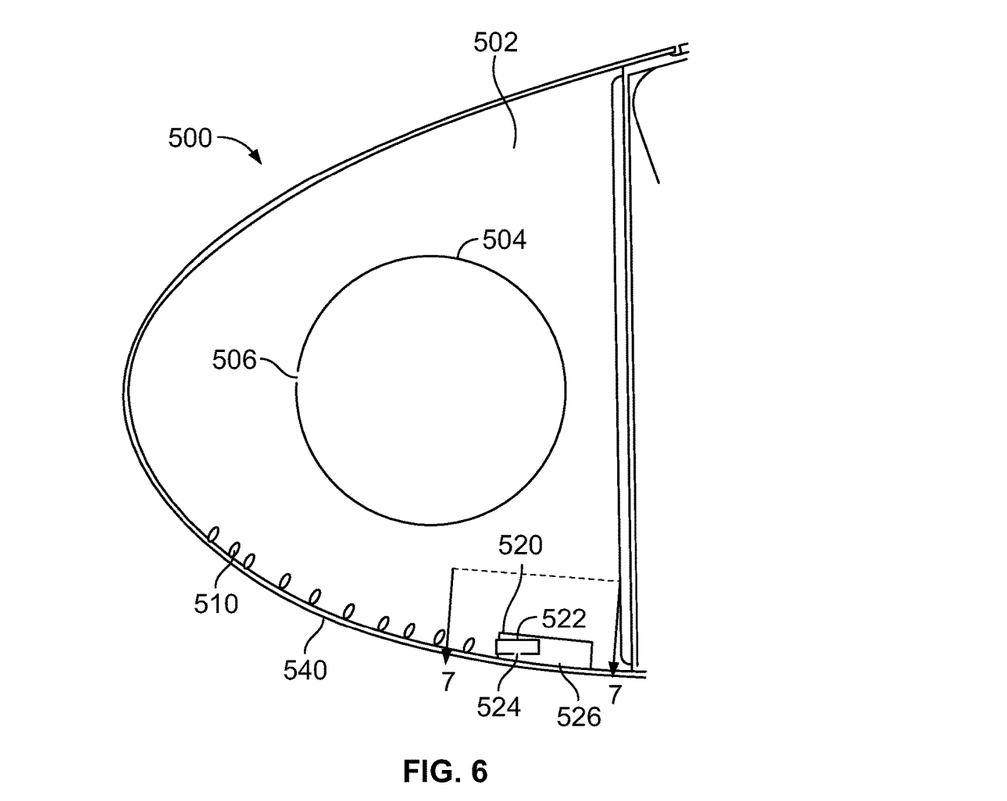
FIG. 6 is a diagrammatic representation of a cross-sectional view of a leading edge of a wing, according to an embodiment of the present disclosure.
Figure 7:
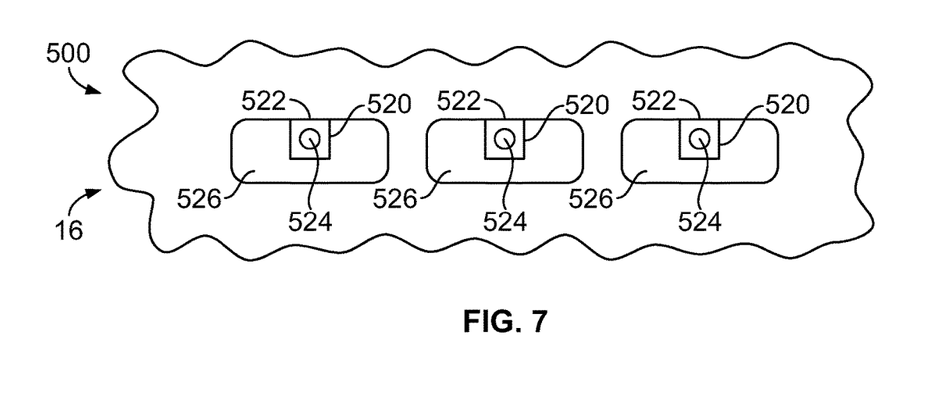
FIG. 7 is a diagrammatic representation of a cross-sectional view of a leading edge of a wing through line 7-7 of FIG. 6, according to an embodiment of the present disclosure.

FIG. 6 is a diagrammatic representation of a cross-sectional view of a leading edge 500 of a wing 16, according to an embodiment of the present disclosure. FIG. 7 is a diagrammatic representation of a cross-sectional view of the leading edge 500 of the wing 16 through line 7-7 of FIG. 6, according to an embodiment of the present disclosure.

Referring to FIGS. 2, 6, and 7, the leading edge 500 defines an internal chamber 502. A delivery conduit 504 (such as a tube, manifold, or the like) having one or more openings 506 is secured within the internal chamber 502 and is coupled to the wing delivery conduit 132. As such, heated gas is delivered from the wing delivery conduit 132 to the internal chamber 502 through the delivery conduit 504. As noted, the heated gas, as a product of combustion, includes condensate 510.

A condensate collection barrier 520 such as a scupper (for example, a wall, fin, fence, or the like) is coupled to a transfer conduit 522, such as a plastic tube (such as a Tygon tube), having an opening 524 that connects to an exhaust outlet, such as an exhaust slot 526 formed through a lower surface of the leading edge 500. The condensate 510 drops to the bottom 540 of the leading edge 500, and impinges on the condensate collection barrier 520, which guides the condensate 510 into the transfer conduit 522. The condensate 510 passes out of the exhaust slot 526 via the opening 524. The condensate collection barrier 520 disrupts the flow of condensate 510 within the internal chamber 502 and channels the condensate 510 into the transfer conduit 522. As shown in FIG. 7, the leading edge 500 may include a plurality of exhaust slots 526, condensate collection barriers 520, and transfer conduits 522.

It has been found that the condensate collection barrier 520 and the transfer conduit 522 increase the efficiency of condensate removal from the leading edge 500 of the wing 16. Alternatively, the leading edge 500 of the wing 16 may not include one or both of the condensate collection barrier 520 or the transfer conduit 522.

Figure 8:
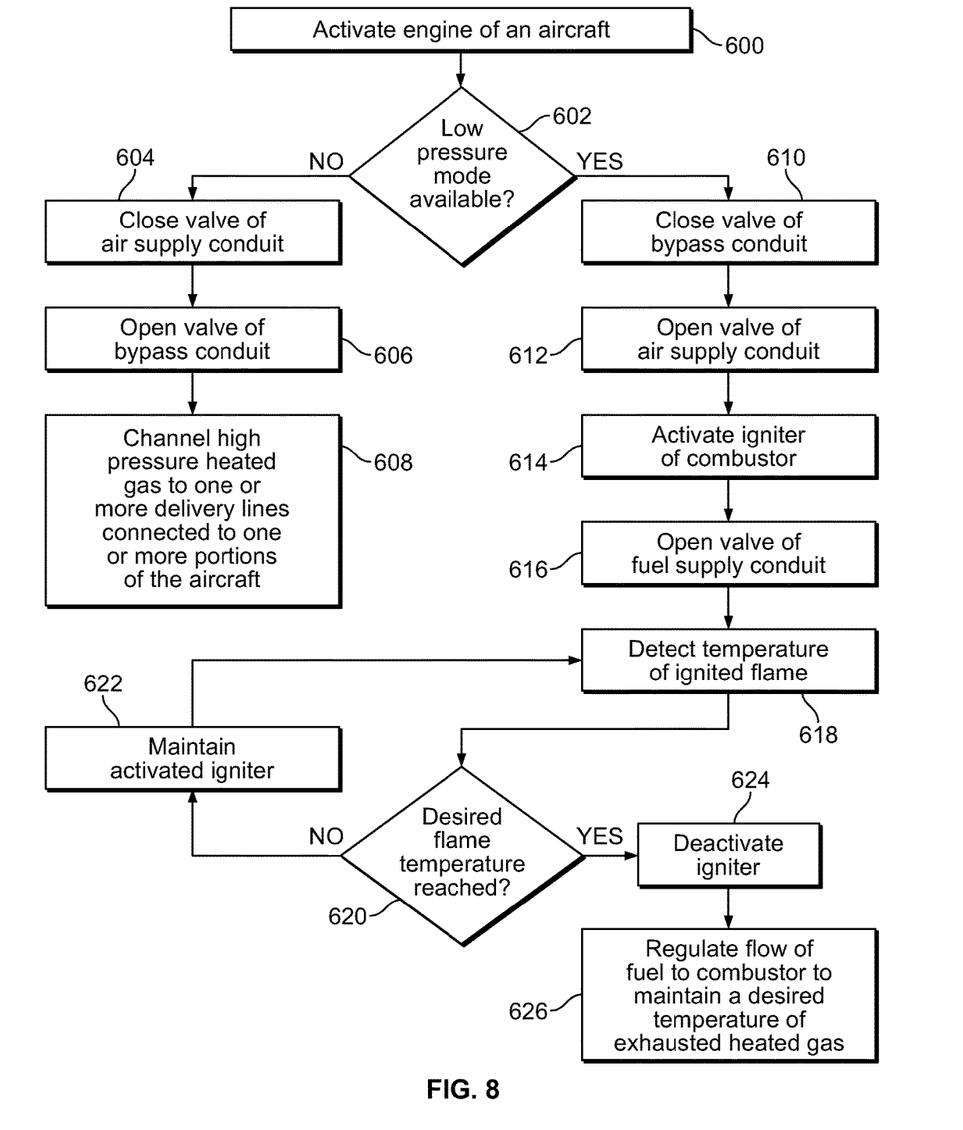
FIG. 8 illustrates a flow chart of preventing ice from forming on or within one or more portions of an aircraft, according to an embodiment of the present disclosure.

FIG. 8 illustrates a flow chart of preventing ice from forming on or within one or more portions of an aircraft, according to an embodiment of the present disclosure. The method begins at 600, in which an engine of an aircraft is activated.

Referring to FIGS. 2 and 8, at 602, it is determined if a low pressure mode of ice prevention is available for use. For example, the ice prevention control unit 146 may monitor the ice prevention system 111 to determine whether the components of thereof are properly functioning. As an example, the ice prevention control unit 146 may be in communication with combustor 116 to determine whether or not the combustor is properly functioning.

If the ice prevention control unit 146 determines that the low pressure mode is not available, the ice prevention may switch to a high pressure mode of ice prevention, in which the ice prevention control unit 146 closes the valve 113 of the air supply conduit 112 at 604. The ice prevention control unit 146 opens the valve 141 of the bypass conduit 138 at 606. At 608, high pressure heated gas is then channeled to one or more delivery conduits (for example, the delivery conduits 130 and 132) connected to one or more portions of the aircraft.

If, at 602, the ice prevention control unit 146 determines that the low pressure mode is available, then at 602, the ice prevention control unit closes the valve 141 of the bypass conduit 138 at 610. The ice prevention control unit 146 opens the valve 113 of the air supply conduit 112 at 612. The ice prevention control unit 146 then activates the igniter 127 of the combustor 116 at 614, and opens the valve 126 of the fuel supply conduit 124 at 616. The ice prevention control unit 146 then detects the temperature of the ignited flame at 618 through a temperature sensor (such as a thermometer, thermostat, or the like).

At 620, the ice prevention control unit 146 determines if a desired flame temperature is reached. The desired flame temperature is the temperature at which the ignited flame generates heated gas at a desired temperature for ice prevention. If the ice prevention control unit 146 determines that the desired flame temperature is not reached, the method proceeds from 620 to 622, in which the ice prevention control unit 146 may maintain the activated igniter 127, and the method returns to 618. In at least one embodiment, the igniter 127 does not need to remain active in order for the combustor to operate.

If, at 620, the desired flame temperature is reached, the method proceeds from 620 to 624, in which the ice prevention control unit 146 deactivates the igniter 127. The ice prevention control unit then regulates the flow of fuel to the combustor 116 (such as through operation of the valve 113)

at 626 to maintain a desired temperature of exhausted heated gas that is then channeled to portions of the aircraft for ice prevention.

Referring to FIGS. 1-8, embodiments of the present disclosure provide efficient systems and methods for preventing ice formation on and in portions of an aircraft. Embodiments of the present disclosure provide systems and methods that increases engine efficiency of an aircraft while preventing ice formation on or in one or more portions of an aircraft.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An ice prevention system that is configured to prevent ice from forming with respect to one or more portions of an aircraft, the ice prevention system comprising:
    a combustor having an air inlet and a gas outlet, wherein the combustor is within the housing of an engine between a fan and an engine core;
    a supply air conduit coupled to the air inlet of the combustor, wherein the supply air conduit is configured to channel low pressure air to the combustor, wherein the low pressure air is air that has not been compressed within the engine core; and
    one or more delivery conduits coupled to the gas outlet of the combustor, the one or more delivery conduits further coupled to the one or more portions of the aircraft, wherein the combustor is configured to exhaust heated gas to the one or more delivery conduits through the gas outlet to prevent ice from forming or melt ice with respect to the one more portions of the aircraft.

2. The ice prevention system of claim 1, wherein the supply air conduit is configured to receive the low pressure air from one or more engine compressors.

3. The ice prevention system of claim 1, further comprising:
    a combustor fuel supply conduit coupling the combustor to a main fuel supply conduit of an engine;
    a first valve disposed within the supply air conduit, wherein the first valve is selectively actuated between open and closed positions; and
    a second valve disposed within the combustor fuel supply conduit, wherein the second valve is selectively actuated between open and closed positions.

4. The ice prevention system of claim 3, wherein an ice prevention control unit is in communication with and configured to control an igniter of the combustor, the first valve, and the second valve.

5. The ice prevention system of claim 4, wherein the ice prevention control unit is configured to:
    open the first valve to channel the low pressure air into the combustor through the supply air conduit;
    open the second valve to provide fuel to the combustor;
    activate the igniter to ignite a flame within the combustor;
    monitor a temperature of the flame to determine whether a desired flame temperature has been reached; and
    monitor a temperature of the exhausted heated gas to determine whether a desired gas temperature has been reached.

6. The ice prevention system of claim 1, wherein the one or more delivery conduits comprises one or both of:
    an engine lip delivery conduit configured to channel the exhausted heated gas to an interior chamber of a lip skin of the engine; and
    a wing delivery conduit configured to channel the exhausted heated gas to an internal chamber of a leading edge of a wing of the aircraft.

7. The ice prevention system of claim 6, further comprising at least one condensate collection barrier coupled to at least one transfer conduit within one or both of the interior chamber of the lip skin or the internal chamber of the leading edge of the wing, wherein the at least one condensate collection barrier is configured to guide condensate into the at least one transfer conduit and out of one or more exhaust outlets formed through one or both of the lip skin of the engine or the leading edge of the wing.

8. The ice prevention system of claim 1, further comprising:
a bypass conduit that is configured to couple a bleed air outlet of the engine core to the one or more delivery conduits; and
a valve disposed within the bypass conduit, wherein the valve is selectively actuated between an open position in which high pressure heated gas from the engine core is supplied to the one or more delivery conduits, and a closed position that prevents the high pressure heated gas from passing into the one or more delivery conduits, wherein the high pressure heated gas is gas that is heated by compression within the engine core.

9. The ice prevention system of claim 1, further comprising at least one swirl nozzle disposed within the one or more delivery conduits.

10. The ice prevention system of claim 9, wherein the at least one swirl nozzle is selectively actuated between a first position and a second position.

11. The ice prevention system of claim 10, wherein the first position is a low pressure setting, and wherein the second position is a high pressure setting.

12. An ice prevention method of preventing ice from forming with respect to one or more portions of an aircraft, the ice prevention method comprising:
coupling a supply air conduit to an air inlet of a combustor within a housing of an engine between a fan and an engine core, wherein the combustor include an igniter, an air inlet and a gas outlet;
coupling one or more delivery conduits to a gas outlet of the combustor and the one or more portions of the aircraft;
channeling low pressure air to the combustor through the supply air conduit, wherein the low pressure air is air that has not been compressed within the engine core;
exhausting heated gas from the combustor to the one or more delivery conduits through the gas outlet;
delivering the heated gas to the one or more portions of the aircraft through the one or more delivery conduits; and
preventing ice from forming or melting ice with respect to the one more portions of the aircraft due to the delivering operation.

13. The ice prevention method of claim 12, further comprising:
receiving the low pressure air within the supply air conduit from a compressor of the engine.

14. The ice prevention method of claim 12, further comprising:
coupling the combustor to a main fuel supply conduit of the engine with a combustor fuel supply conduit;
disposing a first valve within the supply air conduit; and
disposing a second valve within the combustor fuel supply conduit.

15. The ice prevention method of claim 14, further comprising controlling an igniter of the combustor, the first valve, and the second valve with an ice prevention control unit.

16. The ice prevention method of claim 15, further comprising:
opening the first valve to channel the low pressure air into the combustor through the supply air conduit;
opening the second valve to provide fuel to the combustor;
activating the igniter to ignite a flame within the combustor;
monitoring a temperature of the flame to determine whether a desired flame temperature has been reached; and
monitoring a temperature of the exhausted heated gas to determine whether a desired gas temperature has been reached.

17. The ice prevention method of claim 12, wherein the one or more delivery conduits comprises one or both of:
an engine lip delivery conduit configured to channel the exhausted heated gas to an interior chamber of a lip skin of the engine; and
a wing delivery conduit configured to channel the exhausted heated gas to an internal chamber of a leading edge of a wing of the aircraft.

18. The ice prevention method of claim 17, further comprising:
coupling at least one condensate collection barrier to at least one transfer conduit within one or both of the interior chamber of the lip skin or the internal chamber of the leading edge of the wing; and
using the at least one condensate collection barrier to guide condensate into the at least one transfer conduit and out of one or more exhaust outlets formed through one or both of the lip skin of the engine or the leading edge of the wing.

19. The ice prevention method of claim 12, further comprising:
coupling a bleed air outlet of the engine core to the one or more delivery conduits with a bypass conduit;
disposing a valve within the bypass conduit; and
selectively actuating the valve between an open position in which high pressure heated gas from the engine core is supplied to the one or more delivery conduits, and a closed position that prevents the high pressure heated gas from passing into the one or more delivery conduits, wherein the high pressure heated gas is gas that is heated by compression within the engine core.

20. The ice prevention method of claim 12, further comprising disposing at least one swirl nozzle within the one or more delivery conduits.

21. The ice prevention method of claim 20, selectively actuating the at least one swirl nozzle between a low pressure setting and a high pressure setting.

22. An aircraft comprising:
a fuselage;
wings extending from the fuselage;
an empennage extending from the fuselage;
at least one engine connected to one or more of the fuselage, the wings, or the empennage, wherein the at least one engine comprises a housing, a fan, engine core, and a main fuel supply conduit; and
an ice prevention system that is configured to prevent ice from forming or melt ice with respect to one or more portions of an aircraft, the ice prevention system comprising:
a combustor having an igniter, an air inlet and a gas outlet, wherein the combustor is within the housing of the at least one engine between the fan and the engine core;
a supply air conduit coupled to the air inlet of the combustor, wherein the supply air conduit is configured to receive low pressure air from a compressor and channel the low pressure air to the combustor, wherein the low pressure air is air that has not been compressed within the engine core;
one or more delivery conduits coupled to the gas outlet of the combustor, the one or more delivery conduits further coupled to the one or more portions of the aircraft, wherein the combustor is configured to exhaust heated gas to the one or more delivery conduits through the gas outlet to prevent ice from forming with respect to the one more portions of the aircraft;

a combustor fuel supply conduit coupling the combustor to the main fuel supply;

a first valve disposed within the supply air conduit, wherein the first valve is selectively actuated between open and closed positions; and a second valve disposed within the combustor fuel supply conduit, wherein the second valve is selectively actuated between open and closed positions;

an ice prevention control unit in communication with and configured to control the igniter, the first valve, and the second valve, wherein the ice prevention control unit is configured to: (a) open the first valve to channel the low pressure air into the combustor through the supply air conduit, (b) open the second valve to provide fuel to the combustor, (c) activate the igniter to ignite a flame within the combustor, (d) monitor a temperature of the flame to determine whether a desired flame temperature has been reached, and (e) monitor a temperature of the exhausted heated gas to determine whether a desired gas temperature has been reached.

23. The aircraft of claim 22, wherein the one or more delivery conduits comprises one or both of:

an engine lip delivery conduit configured to channel the exhausted heated gas to an interior chamber of a lip skin of the at least one engine; and a wing delivery conduit configured to channel the exhausted heated gas to an internal chamber of a leading edge of a wing of the aircraft.

24. The aircraft of claim, 23, wherein the ice prevention system further comprises at least one condensate collection barrier coupled to at least one transfer conduit within one or both of the interior chamber of the lip skin or the internal chamber of the leading edge of the wing, wherein the at least one condensate collection barrier is configured to guide condensate into the at least one transfer conduit and out of one or more exhaust outlets formed through one or both of the lip skin of the engine or the leading edge of the wing.

25. The aircraft of claim 22, wherein the ice prevention system further comprises:

a bypass conduit that is configured to couple a bleed air outlet of the engine core to the one or more delivery conduits; and a valve disposed within the bypass conduit, wherein the valve is selectively actuated between an open position in which high pressure heated gas from the engine core is supplied to the one or more delivery conduits, and a closed position that prevents the high pressure heated gas from passing into the one or more delivery conduits, wherein the high pressure heated gas is gas that is heated by compression within the engine core.

26. The aircraft of claim 22, wherein the ice prevention system further comprises at least one swirl nozzle disposed within the one or more delivery conduits.

27. The aircraft of claim 26, wherein the at least one swirl nozzle is selectively actuated between a low pressure setting and a high pressure setting.

\* \* \* \* \*